United States Patent
Kim et al.

(10) Patent No.: US 8,840,503 B2
(45) Date of Patent: Sep. 23, 2014

(54) HYDROSTATIC MECHANICAL TRANSMISSION EQUIPPED WITH AUTOMATIC MANUAL SUB-GEARSHIFT

(75) Inventors: Su Chul Kim, Seoul (KR); Sang Heon Lee, Hwaseong-si (KR); Sang Hyun Kim, Anyang-si (KR)

(73) Assignee: LS Mtron Ltd., Anyang-si, Gyeonggi-do (KR)

( * ) Notice: Subject to any disclaimer, the term of this patent is extended or adjusted under 35 U.S.C. 154(b) by 173 days.

(21) Appl. No.: 13/558,799

(22) Filed: Jul. 26, 2012

(65) Prior Publication Data

US 2013/0165287 A1 Jun. 27, 2013

(30) Foreign Application Priority Data

Dec. 23, 2011 (KR) ........................ 10-2011-0140940

(51) Int. Cl.
*F16H 47/04* (2006.01)
(52) U.S. Cl.
USPC .............................................. 475/74; 475/80
(58) Field of Classification Search
CPC .................................................... F16H 47/04
USPC ................................................. 475/73, 74, 80
See application file for complete search history.

(56) References Cited

U.S. PATENT DOCUMENTS

| | | | | |
|---|---|---|---|---|
| 5,129,867 A | * | 7/1992 | Fredriksen et al. | 475/79 |
| 5,156,577 A | * | 10/1992 | Fredriksen et al. | 475/74 |
| 5,496,223 A | * | 3/1996 | Jarchow | 475/72 |
| 6,852,056 B2 | * | 2/2005 | Weeramantry | 475/73 |
| 2010/0184551 A1 | * | 7/2010 | Hiraoka et al. | 475/80 |

* cited by examiner

*Primary Examiner* — Sherry Estremsky
(74) *Attorney, Agent, or Firm* — Sherr & Jiang, PLLC

(57) ABSTRACT

A hydrostatic mechanical transmission according to the disclosure includes: a hydrostatic transmission which transmits power generated in an engine using a pump and a motor; a main transmission unit which transmits the engine power to a final driving unit through a driving shaft; a complex planetary gear which synthesizes and transmits the engine power transmitted from the hydrostatic transmission and the main transmission unit; and an automatic manual sub-gearshift which receives the synthesized engine power from the complex planetary gear so as to perform a transmission function and transmits the engine power to the final driving unit.

6 Claims, 2 Drawing Sheets

HYDROSTATIC MECHANICAL TRANSMISSION EQUIPPED WITH AUTOMATIC MANUAL SUB-GEARSHIFT

CROSS-REFERENCE TO RELATED APPLICATION

This application claims priority to Korean Patent Application No. 10-2011-0140940, filed on Dec. 23, 2011, and all the benefits accruing therefrom under 35 U.S.C. §119, the contents of which in its entirety are herein incorporated by reference.

BACKGROUND

1. Field

The disclosure relates to a hydrostatic mechanical transmission, and more particularly, to an efficient and optimal hydrostatic mechanical transmission equipped with an automatic manual transmission (AMT) type sub-gearshift which includes a hydrostatic transmission, a complex planetary gear, and an automatic manual sub-gearshift, facilitates spindle machining, and reduces material cost thereof.

2. Description of the Related Art

A hydraulic transmission system is commonly used in large vehicles or stationary equipment. However, the hydraulic transmission efficiency decreases as the output speed increases at a predetermined gear setting state. Accordingly, it is not an efficient way to perform a hydraulic transmission at the upper part of the gear setting. These problems may be solved by using multiple gear settings, but the advantage of the hydraulic transmission is degraded due to the complexity of the transmission.

As an alternative of the hydraulic transmission system, there is a mechanical transmission system. However, the existing mechanical transmission system is limited to a non-continuous gear ratio which does not permit the limitless speed ratio that is proved in a hydraulic transmission. In the full-speed output, there is a need to perform multiple types of power management between the engine and the transmission in order to maintain the efficiency of the transmission. The simple mechanical transmission is not appropriate for guaranteeing the efficient use of the effective power of the engine due to a non-continuous speed ratio. The simple hydraulic transmission has poor efficiency originally at a high operation speed.

Accordingly, there has been an attempt to provide the more efficient transmission system for large and small vehicles and stationary equipment by the combination of the hydraulic transmission system and the mechanical transmission system. Such a hydro-mechanical transmission system uses a hydrostatic mechanical structure in which the angle of the inclination plate of the variable displacement hydraulic pump is changed by a pedal operation, the operation speed of the fixed displacement hydraulic motor is changed to an endless stage, and the speed-change output is changed in multiple stages in a gear type transmission so as to drive a vehicle wheel.

As such a hydrostatic mechanical transmission system, a power distributing transmission is a multi-path transmission in which two or more power transmission paths are provided through a planetary gear, and is an endless transmission in which the entire transmission becomes an endless type by using the endless transmission as a variator in one path among the paths. Furthermore, the hydro-mechanical transmission (HMT) is a power distributing transmission which uses a hydrostatic transmission as a variator, and may be classified into a simple planetary gear type using one planetary gear and a complex planetary gear type using two or more planetary gears. In the planetary gear type, a sub-gearshift is disposed in rear of the planetary gear so as to have a plurality of speed ranges. And, the automatic manual transmission (AMT) is an automatic transmission obtained by automating a manual transmission, and in general, includes a synchro-type transmission gear, an actuator, and a power interrupting clutch.

Most of the sub-gearshifts of the hydro-mechanical transmissions adopt a wet multi-clutch type, and in order to improve durability and obtain soft intermitting performance of the clutch, the wet type is desirable, but slight power loss occurs due to the accompanying oil. Furthermore, as the configuration of the hydraulic system, spindle machining is not easy, a necessary space is wide, and high material cost is demanded.

Accordingly, there has been an attempt to realize the more efficient driving system for large and small vehicles such as a tractor, an automobile, and heavy equipment and stationary equipment by adopting a cheap automatic manual transmission (AMT) type instead of an expensive wet multi-clutch of a hydrostatic endless transmission type so as to reduce material cost and facilitate spindle machining.

SUMMARY

The present disclosure is directed to providing a hydrostatic mechanical transmission equipped with an automatic manual transmission type sub-gearshift, where the material cost may be reduced and the spindle machining may be facilitated. Furthermore, the sub-gearshifting and the reversing may be simultaneously realized by using the automatic manual transmission type synchro-transmission and the pair of clutches without any additional clutch.

In one aspect, there is provided a hydrostatic mechanical transmission including: a hydrostatic transmission (HST) which transmits power generated in an engine using a pump and a motor; a main transmission unit which transmits the engine power to a final driving unit through a driving shaft; a complex planetary gear which synthesizes and transmits the engine power transmitted from the hydrostatic transmission and the main transmission unit; and an automatic manual sub-gearshift which receives the synthesized engine power from the complex planetary gear so as to perform a transmission function and transmits the engine power to the final driving unit.

The main transmission unit may include a first gear set which transmits the engine power to the hydrostatic transmission and a second gear set which is coaxially connected to the first gear set and transmits the engine power transmitted from the first gear set to the complex planetary gear.

The engine power transmitted to the hydrostatic transmission may be transmitted to the complex planetary gear through a third gear set.

The automatic manual sub-gearshift may include: a synchro-transmission which receives the synthesized engine power from the complex planetary gear so as to perform a transmission function; and a clutch which selectively intermits the engine power transmitted from the synchro-transmission and transmits the engine power to the final driving unit.

The engine power synthesized in the complex planetary gear may be transmitted to a sun gear or a carrier, and the synchro-transmission receives the engine power from the sun gear or the carrier so as to perform a transmission function.

The hydrostatic transmission may include a hydrostatic transmission pump and a hydrostatic transmission motor which are connected in parallel to each other. The hydrostatic transmission pump may be a variable displacement hydraulic pump which receives power from the gears of the first gear set and changes the tilting angle so as to change the discharge rate. The hydrostatic transmission motor may be a fixed displacement motor which transmits power to the gears of the third gear set and has a fixed tilting angle.

The synchro-transmission may include: a first synchro-transmission which selects a first-stage sub-gearshift gear set or a third-stage sub-gearshift gear set and transmits power to the output shaft; and a second synchro-transmission which selects a second-stage sub-gearshift gear set or the reversing gear set and transmits power to the output shaft.

The reversing gear set may include: a first reversing gear set which transmits power transmitted from the carrier to a reversing gear shaft through a gear; and a second reversing gear set which transmits power transmitted to the reversing gear shaft to the second synchro-transmission through a gear.

The complex planetary gear may include: a first pinion gear which transmits power between the ring gear and the sun gear transmitted from the second gear set; and a second pinion gear which transmits power between the first pinion gear and the sun gear.

According to the disclosure, since a cheap automatic manual sub-gearshift is used instead of an expensive wet multi-clutch, the material cost may be reduced and the spindle machining may be facilitated. Furthermore, the sub-gearshifting and the reversing may be simultaneously realized by using the synchro-transmission of the automatic manual transmission type synchro-transmission and the pair of clutches without any additional clutch.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF MAIN ELEMENTS

Figure 1:
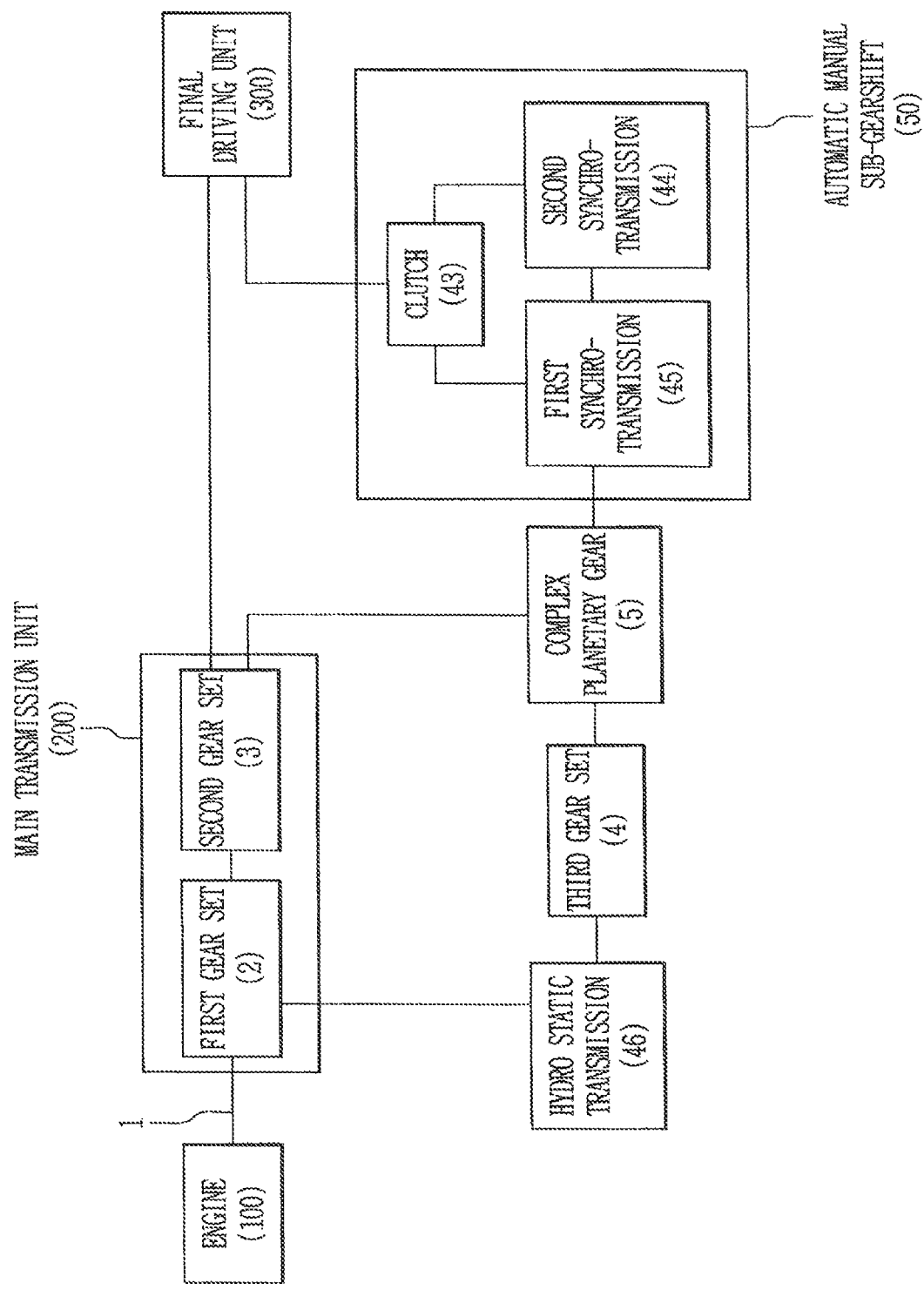
FIG. 1 is a distribution diagram illustrating a power transmission of a vehicle which adopts a hydrostatic mechanical transmission including an automatic manual sub-gearshift of the disclosure.

1: DRIVING SHAFT
2: FIRST GEAR SET
3: SECOND GEAR SET
4: THIRD GEAR SET
5: COMPLEX PLANETARY GEAR
6a: FIRST REVERSING GEAR SET
6b: SECOND REVERSING GEAR SET
7: FIRST-STAGE SUB-GEARSHIFT GEAR SET
8: THIRD-STAGE SUB-GEARSHIFT GEAR SET
9: SECOND-STAGE SUB-GEARSHIFT GEAR SET
15, 20: SUN GEAR
18a: FIRST PINION GEAR
18b: SECOND PINION GEAR
19: CARRIER
21: COMPLEX PLANETARY GEAR SUN GEAR OUTPUT SHAFT
22: RING GEAR
23, 30, 31: REVERSING GEAR
24: FIRST-STAGE SUB-GEARSHIFT GEAR
25: THIRD-STAGE SUB-GEARSHIFT GEAR
26: SECOND-STAGE SUB-GEARSHIFT GEAR
39, 40: FOUR-WHEELED DRIVING GEAR
34, 41: OUTPUT SHAFT
43: CLUTCH
44: SECOND SYNCHRO-TRANSMISSION
45: FIRST SYNCHRO-TRANSMISSION
46: HYDROSTATIC TRANSMISSION (HST)
47a: HYDROSTATIC TRANSMISSION PUMP
47b: HYDROSTATIC TRANSMISSION MOTOR
50: AUTOMATIC MANUAL SUB-GEARSHIFT
100: ENGINE
200: MAIN TRANSMISSION UNIT
300: FINAL DRIVING UNIT

DETAILED DESCRIPTION

Hereinafter, referring to the drawings, the structure of the hydrostatic mechanical transmission according to the disclosure will be described in more detail.

FIG. 1 is a distribution diagram illustrating a power transmission of a vehicle which adopts a hydrostatic mechanical transmission including an automatic manual sub-gearshift of the disclosure. Referring to FIG. 1, the hydrostatic mechanical transmission according to the disclosure includes a hydrostatic transmission (HST) 46, a main transmission unit 200, a complex planetary gear 5, and an automatic manual sub-gearshift 50. The hydrostatic transmission 46 transmits power which is generated in an engine 100 using a pump 47a and a motor 47b. The pump 47a may be a variable displacement hydraulic pump of which the discharge rate changes with a change in the tilting angle, and the motor 47b may be a fixed displacement motor of which the tilting angle is fixed.

The main transmission unit 200 transmits engine power to a final driving unit 300 through a driving shaft 1. The main transmission unit 200 includes a first gear set 2 and a second gear set 3, where the first gear set 2 transmits the engine power to the hydrostatic transmission 46, and the second gear set 3 transmits the engine power transmitted from the first gear set 2 to the complex planetary gear 5. Furthermore, the engine power which is transmitted to the hydrostatic transmission 46 through the first gear set 2 may be transmitted to the complex planetary gear 5 through the third gear set 4.

The complex planetary gear 5 combines the engine power transmitted from the hydrostatic transmission 46 and the second gear set 3 of the main transmission unit 200, and transmits it to the automatic manual sub-gearshift 50.

The automatic manual sub-gearshift 50 includes synchro-transmissions 44 and 45 and a clutch 43. The synchro-transmissions 44 and 45 perform a transmission function by receiving the synthesized engine power from the complex planetary gear 5, and the clutch 43 selectively intermits the engine power transmitted from the synchro-transmissions 44 and 45 and transmits the engine power to the final driving unit 300.

Figure 2:
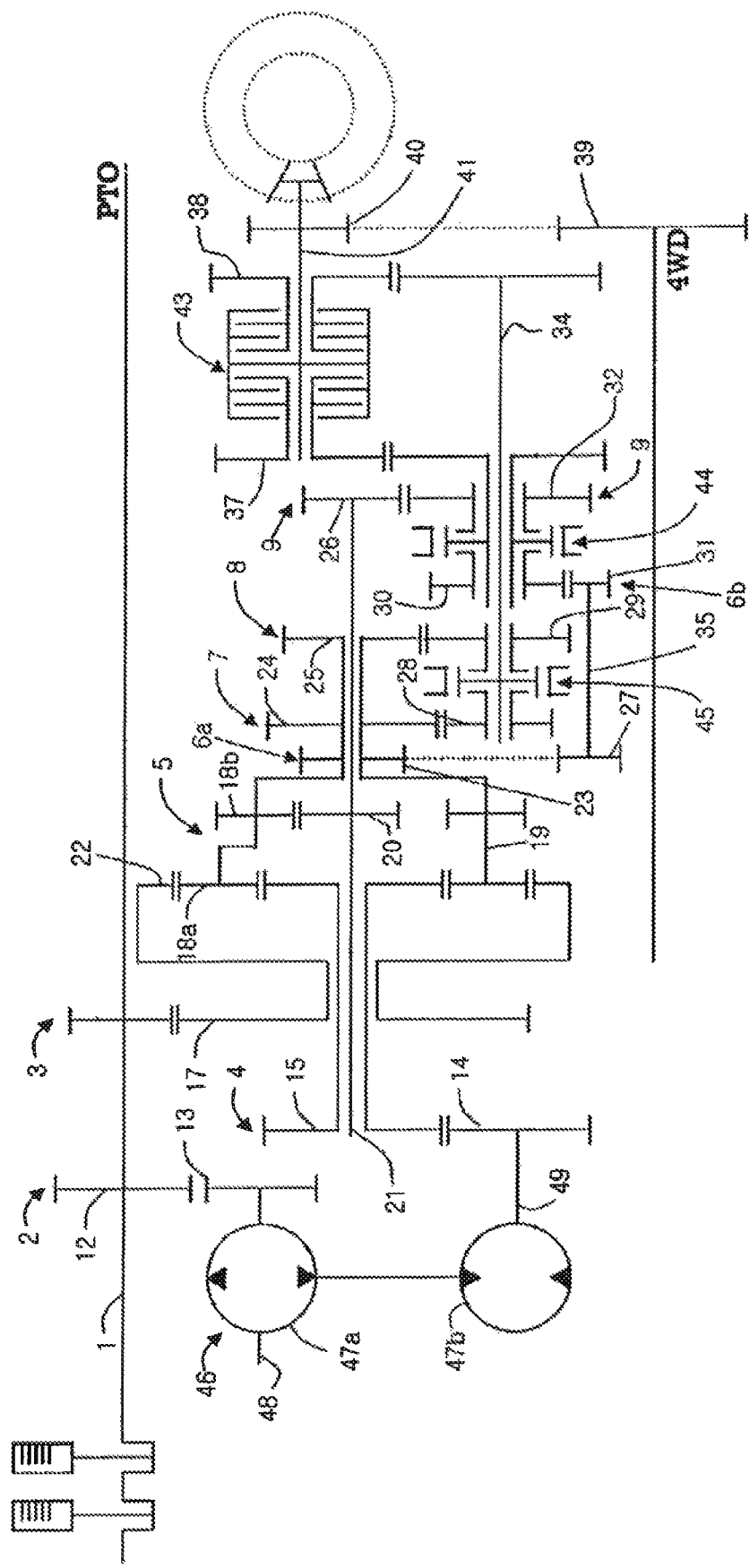
FIG. 2 is a block diagram illustrating the hydrostatic mechanical transmission including the automatic manual sub-gearshift of the disclosure.

FIG. 2 is a block diagram illustrating the hydrostatic mechanical transmission including the automatic manual sub-gearshift of the disclosure. Referring to FIG. 2, the main transmission unit 200 includes the first gear set 2 and the second gear set 3, where the first gear set 2 and the second gear set 3 may be coaxially connected to the driving shaft 1, and respectively include a plurality of gears. The synchro-transmissions 44 and 45 of the automatic manual sub-gearshift include a first synchro-transmission 45 and a second synchro-transmission 44 and perform a transmission function, where the synthesized engine power from the complex planetary gear 5 is transmitted to a sun gear 20 or a carrier 19, and the synchro-transmissions 44 and 45 receive the engine power from the sun gear 20 or the carrier 19.

The hydrostatic transmission 46 includes a hydrostatic transmission pump 47a and a hydrostatic transmission motor 47b which are connected in parallel to each other. The hydrostatic transmission pump 47a may be a variable displacement hydraulic pump which receives power from the gears 12 and 13 of the first gear set 2 and of which the discharge rate changes with a change in the tilting angle. The hydrostatic transmission motor 47b may be a fixed displacement motor which transmits power to the gears 14 and 15 of the third gear set 4 and of which the tilting angle is fixed.

The complex planetary gear 5 may include a first pinion gear 18a and a second pinion gear 18b therein. The first pinion gear 18a transmits power between the ring gear 22 and the sun gear 15, and the second pinion gear 18b transmits power between the first pinion gear 18a and the sun gear 20, where the power is transmitted from the second gear set 3. The third gear set 4 includes a plurality of gears 14 and 15 which transmit the power transmitted from the hydrostatic transmission 46 to the complex planetary gear 5.

The automatic manual sub-gearshift 50 performs a transmission function by receiving the engine power which is synthesized and transmitted from the complex planetary gear 5, and transmits the engine power to the final driving unit 300. The automatic manual sub-gearshift 50 includes synchro-transmissions 44 and 45 and a clutch 43. The synchro-transmissions 44 and 45 perform a transmission function by receiving the engine power from the sun gear 20 or the carrier 19. The clutch 43 selects the power transmitted from the synchro-transmissions 44 and 45, and transmits the power to rear wheels connected to output shafts 34 and 41. The synchro-transmissions 44 and 45 include the first synchro-transmission 45 and the second synchro-transmission 44, where the first synchro-transmission 45 may transmit power to the output shaft 34 by selecting the first-stage gear or the third-stage gear. The second synchro-transmission 44 may transmit power to the output shaft 34 by selecting the second-stage gear or the reversing gear 31.

The reversing gears 23 and 31 may include a first reversing gear set 6a which transmits the power transmitted from the carrier 19 to the reversing gear shaft 35 through the gear 27 and a second reversing gear set 6b which transmits the power transmitted to the reversing gear shaft 35 to the second synchro-transmission 44 through the gear 30.

Referring to FIG. 1 and FIG. 2, when examining the operation procedure of the hydrostatic mechanical transmission equipped with the automatic manual sub-gearshift according to the disclosure, power is generated from the engine in response to the operation signal of the operation input unit connected to the driving shaft 1, and the generated power is transmitted to the first gear set 2 and the second gear set 3. Furthermore, the hydrostatic transmission 46 may include a hydrostatic transmission pump 47a and a hydrostatic transmission motor 47b. When the engine power is transmitted to the gear 13 through the gear 12, meshing with the gear 13, of the first gear set 2, a pump shaft 48 connected to the gear 13 rotates, so that the hydrostatic transmission pump 47a is operated. That is, the first gear set 2 transmits power between the engine and the hydrostatic transmission 46, the second gear set 3 transmits power between the engine and the ring gear 22 of the complex planetary gear 5, and the third gear set 4 transmits power between the hydrostatic transmission 46 and the complex planetary gear 5.

The hydrostatic transmission motor 47b rotates a motor shaft 49 so as to transmit power to the gear 14, and the gear 14 meshes with the sun gear 15 so as to transmit the power to the sun gear 15. Furthermore, the power is transmitted to a complex planetary gear sun gear output shaft 21 coaxially connected to the sun gear 15, so that the sun gear 20 coaxially connected therewith is driven. A first-stage sub-gearshift gear set 7, a second-stage sub-gearshift gear set 9, a third-stage sub-gearshift gear set 8, and a reversing gear 23 are coaxially connected to the complex planetary gear sun gear output shaft 21. The first-stage sub-gearshift gear set 7 transmits the power transmitted from the carrier 19 connected to the sun gear 15 to the first synchro-transmission 45 through a gear 28 meshing with the first-stage sub-gearshift gear 24. The second-stage sub-gearshift gear set 9 transmits the power transmitted from the sun gear 20 to the second synchro-transmission 44 through the gear 32. The third-stage sub-gearshift gear set 8 transmits the power transmitted from the carrier 19 to the first synchro-transmission 45 through the gear 29 meshing with the third-stage sub-gearshift gear 25. The first and second synchro-transmissions 44 and 45 perform an automatic transmission through a motor as an electric actuator. The power transmitted through the first and second synchro-transmissions 44 and 45 is transmitted to the clutch 43. The power transmitted to the clutch 43 is supplied to the rear wheel as the final driving unit 300 through the four-wheeled driving gears 39 and 40.

The ring gear 22 of the complex planetary gear 5 transmits the power transmitted from the gear 17 to the first pinion gear 18a inside the complex planetary gear 5, the power transmitted to the first pinion gear 18a is transmitted to the second pinion gear 18b, and the power is transmitted to the first synchro-transmission 45 and the second synchro-transmission 44 through the meshing between the second pinion gear 18b and the sun gear 20.

The automatic manual sub-gearshift 50 includes the first synchro-transmission 45, the second synchro-transmission 44, and the clutch 43, where the first synchro-transmission 45 automatically selects the first-stage sub-gearshift gear set 7 or the third-stage sub-gearshift gear set 8 so as to transmit power to the output shafts 34 and 41, and the second synchro-transmission 44 selects the second-stage sub-gearshift gear set 9 or the reversing gear sets 6a and 6b so as to transmit power to the output shafts 34 and 41. When examining the gear-shifting operation from the first stage to the second stage, the first synchro-transmission 45 is operated at the first stage, the second synchro-transmission 44 is connected in a second stage, and the clutch 43 is connected to the gear 38 connected to the first-stage sub-gearshift gear set 7. Subsequently, when the gear is shifted to the second stage, the clutch 43 releases the power from the gear 38 and connects the power to the gear 37 connected to the second-stage sub-gearshift gear set 9. When examining the gear-shifting operation from the second stage to the third stage, the first synchro-transmission 45 is shifted to the third-stage state in advance. Then, when it becomes a gear-shifting time point, the clutch 43 releases the gear 37 connected to the second-stage sub-gearshift gear set 9 and connects the power to the gear 38 connected to the third-stage sub-gearshift gear set 8. When examining the reversing gear-shifting operation, at the first-stage reversing sub-gearshifting state, the second synchro-transmission 44 is connected to the reversing gear 30 and the clutch 43 interrupts the power transmitted to the gear 38 and connects the power to the gear 37. At the second-stage reversing sub-gearshifting state, the reversing gearshifting is performed after the speed is decreased through the gearshifting from the second-stage sub-gearshifting state to the first-stage sub-gearshifting state. The gearshifting from the second-stage sub-gearshifting state to the first-stage sub-gearshifting state is performed in a reverse manner compared to the gearshifting from the first-stage sub-gearshifting state to the second-stage sub-gearshifting state. At the third-stage reversing sub-gearshifting state, the reversing gearshifting is performed as in the operation of the first-stage sub-gearshifting state after the speed decreases in the third-stage sub-gearshifting state. In this way, the first-stage sub-gearshifting to the third-stage sub-gearshifting and the reversing gearshifting may be simultaneously realized by using the automatic synchro-transmission and the pair of clutches without any additional clutch.

As examined above, in the hydrostatic mechanical transmission, since a cheap automatic manual sub-gearshift is used instead of an expensive wet multi-type clutch, the material cost may be reduced and the spindle machining may be facilitated. Further, since the sub-gearshifting and the reversing are automatically realized, the efficient and optimal gearshifting may be performed.

While the present disclosure has been described with respect to the specific embodiments, it will be apparent to those skilled in the art that various changes and modifications may be made without departing from the spirit and scope of the disclosure as defined in the following claims.

What is claimed is:

1. A hydrostatic mechanical transmission comprising:
   a hydrostatic transmission which transmits power generated in an engine using a pump and a motor;
   a main transmission unit which transmits the engine power to a final driving unit through a driving shaft;
   a complex planetary gear which synthesizes and transmits the engine power transmitted from the hydrostatic transmission and the main transmission unit; and
   an automatic manual sub-gearshift which receives the synthesized engine power from the complex planetary gear so as to perform a transmission function and transmits the engine power to the final driving unit,
   wherein the automatic manual sub-gearshift includes:
   a synchro-transmission which receives the synthesized engine power from the complex planetary gear so as to perform a transmission function; and
   clutch which selectively intermits the engine power transmitted from the synchro-transmission and transmits the engine power to the final driving unit,
   wherein the engine power synthesized in the complex planetary gear is transmitted to a sun gear or a carrier, and the synchro-transmission receives the engine power from the sun gear or the carrier so as to perform a transmission function,
   wherein the synchro-transmission includes:
   a first synchro-transmission which selects a first-stage sub-gearshift gear set or third-stage gear set and transmits to the output shaft; and
   a second synchro-transmission which selects a second-stage sub-gearshift gear set or a reversing gear set and transmits rower to the output shaft.

2. The hydrostatic mechanical transmission according to claim 1,
   wherein the main transmission unit includes a first gear set which transmits the engine power to the hydrostatic transmission and a second gear set which is coaxially connected to the first gear set and transmits the engine power to the complex planetary gear.

3. The hydrostatic mechanical transmission according to claim 2,
   wherein the engine power transmitted to the hydrostatic transmission is transmitted to the complex planetary gear through a third gear set.

4. The hydrostatic mechanical transmission according to claim 3,
   wherein the hydrostatic transmission includes a hydrostatic transmission pump and a hydrostatic transmission motor which are connected in parallel to each other,
   wherein the hydrostatic transmission pump is a variable displacement hydraulic pump which receives power from the gears of the first gear set and changes the tilting angle so as to change the discharge rate, and
   wherein the hydrostatic transmission motor is a fixed displacement motor which transmits power to the gears of the third gear set and has a fixed tilting angle.

5. The hydrostatic mechanical transmission according to claim 1,
   wherein the reversing gear set includes:
   a first reversing gear set which transmits power transmitted from the carrier to a reversing gear shaft through a gear; and
   a second reversing gear set which transmits power transmitted to the reversing gear shaft to the second synchro-transmission through a gear.

6. The hydrostatic mechanical transmission according to claim 1,
   wherein the complex planetary gear includes:
   a first pinion gear which transmits power between a ring gear and a first sun gear transmitted from the second gear set; and
   a second pinion gear which transmits power between the first pinion gear and a second sun gear.

* * * * *